(12) United States Patent
Amano

(10) Patent No.: US 8,749,141 B2
(45) Date of Patent: Jun. 10, 2014

(54) ELEVATOR CONTROL DEVICE

(75) Inventor: Masaaki Amano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 51 days.

(21) Appl. No.: 13/497,468

(22) PCT Filed: Dec. 16, 2009

(86) PCT No.: PCT/JP2009/070970
§ 371 (c)(1),
(2), (4) Date: Mar. 21, 2012

(87) PCT Pub. No.: WO2011/074085
PCT Pub. Date: Jun. 23, 2011

(65) Prior Publication Data
US 2012/0223642 A1    Sep. 6, 2012

(51) Int. Cl.
*H01K 7/00* (2006.01)
(52) U.S. Cl.
USPC .......................................................... 315/76
(58) Field of Classification Search
None
See application file for complete search history.

(56) References Cited

FOREIGN PATENT DOCUMENTS

| JP | 57-189980 A | 11/1982 |
|---|---|---|
| JP | 60 52991 | 11/1985 |
| JP | 08 231139 | 9/1996 |
| JP | 2002 179349 | 6/2002 |
| JP | 3440559 | 8/2003 |
| JP | 2004 031093 | 1/2004 |
| JP | 2005 241708 | 9/2005 |
| JP | 2006-032364 A | 2/2006 |
| JP | 2006-225071 A | 8/2006 |
| JP | 2007 022720 | 2/2007 |
| JP | 2007 182296 | 7/2007 |

OTHER PUBLICATIONS

International Preliminary Report on Patentability and Written Opinion issued Jul. 19, 2012, in PCT/JP2009/070970 filed Dec. 16, 2009 (submitting English translation only).
Combined Office Action and Search Report issued Oct. 21, 2013 in Chinese Patent Application No. 200980162763.3 with English translation and English translation of categories of cited documents.
International Search Report issued on Mar. 9, 2010 in PCT/JP09/070970 filed on Dec. 16, 2009.
Office Action issued Jul. 23, 2013 in Japanese Patent Application No. 2011-545887 (with partial English language translation).

*Primary Examiner* — Jany Richardson
(74) *Attorney, Agent, or Firm* — Oblon, Spivak, McClelland, Maier & Neustadt, L.L.P.

(57) ABSTRACT

An elevator control device capable of carrying out proper control considering the energy saving and service life of lamp for various types of the lighting fixtures provided in an elevator car. The control device which controls the lighting fixture includes a storage which stores the type of the lighting fixture, a setting mechanism which sets transfer time for automatically pausing the car based on the type of the lighting fixture stored in the storage, and a detector which detects that the car is in a predetermined standby state. The control device turns off the lighting in the car when the standby state of the car continues for the transfer time set by the setting mechanism.

3 Claims, 3 Drawing Sheets

ELEVATOR CONTROL DEVICE

TECHNICAL FIELD

The present invention relates to an elevator control device which controls a lighting fixture provided in an elevator car.

BACKGROUND ART

An elevator is configured so that when a car finishes responding to all calls and the state in which a new call is not registered continues for a predetermined period of time or longer, to reduce power consumption, the lighting in the car is turned off automatically, and the car is paused. In the case where a fluorescent lamp is used as a car lighting fixture, if the turning-on and turning-off are repeated frequently, the deterioration of fluorescent lamp proceeds rapidly, and the service life thereof shortens extremely. Therefore, the elevator has conventionally been configured so that not immediately after the car has finished responding to all calls, but when the state in which a new call is not registered continues for a predetermined period of time after the car has finished responding to all calls, the lighting is turned off, and the car is paused.

In recent years, because of increasing concern about energy saving, an inverter fluorescent lamp and an LED lamp that achieve a higher energy saving effect have been increasingly used as a lighting fixture for an elevator. In particular, the LED lamp has a very high energy saving effect, and, although the initial cost thereof is a little higher than that of the fluorescent lamp, the LED lamp is sometimes more inexpensive than the fluorescent lamp in comparison as to the lifecycle cost including power consumption and the like.

In view of the above-described situation, concerning the lighting fixture provided in the elevator car and a control device which controls the lighting fixture, some techniques have been proposed so far.

For example, Patent Literature 1 proposes a technique such that in an elevator in which if the state of no call continues for a predetermined period of time or longer, the car is paused automatically, if the number of pauses within a certain period exceeds a predetermined value, the subsequent automatic pause is inhibited, and the lighting in the car stays on.

As another conventional technique, there has also been proposed a technique in which by adopting the LED lamp as the lighting fixture in the car, the thickness of a ceiling portion of the car is decreased (for example, refer to Patent Literatures 1 and 2).

CITATION LIST

Patent Literature

Patent Literature 1: Japanese Patent Publication No. 60-52991
Patent Literature 2: Japanese Patent Laid-Open No. 2007-22720
Patent Literature 3: Japanese Patent Laid-Open No. 2007-182296

SUMMARY OF INVENTION

Technical Problem

Unlike the fluorescent lamp, the LED lamp is scarcely deteriorated by the repetition of turning-on and turning-off, and there is no fear that the service life is shortened by the above-described repetition. Therefore, in the case where the LED lamp is adopted as the lighting fixture of an elevator car, by repeating the turning-on and turning-off frequently according to the state of the elevator, a further reduction in power consumption can be anticipated.

However, in the conventional elevator including the elevators described in Patent Literatures 1 to 3, the control has not at all been changed according to the type and property of the lighting fixture of the car.

The present invention was made to solve the above-described problems, and an object of the invention is to provide an elevator control device capable of carrying out proper control considering the energy saving and service life of lamp for various types of the lighting fixtures provided in an elevator car.

Solution of Problem

An elevator control device of the present invention is an elevator control device which controls a lighting fixture provided in an elevator car. The elevator control device comprises storage means which stores the type of the lighting fixture, setting means which sets transfer time for automatically pausing the car based on the type of the lighting fixture stored in the storage means, detecting means which detects that the car is in a predetermined standby state, and lighting control means which turns off the lighting in the car when the standby state of the car continues for the transfer time set by the setting means.

Advantageous Effect of Invention

According to the present invention, proper control considering the energy saving and service life of lamp for various types of the lighting fixtures provided in an elevator car can be carried out.

DESCRIPTION OF EMBODIMENT

Figure 1:
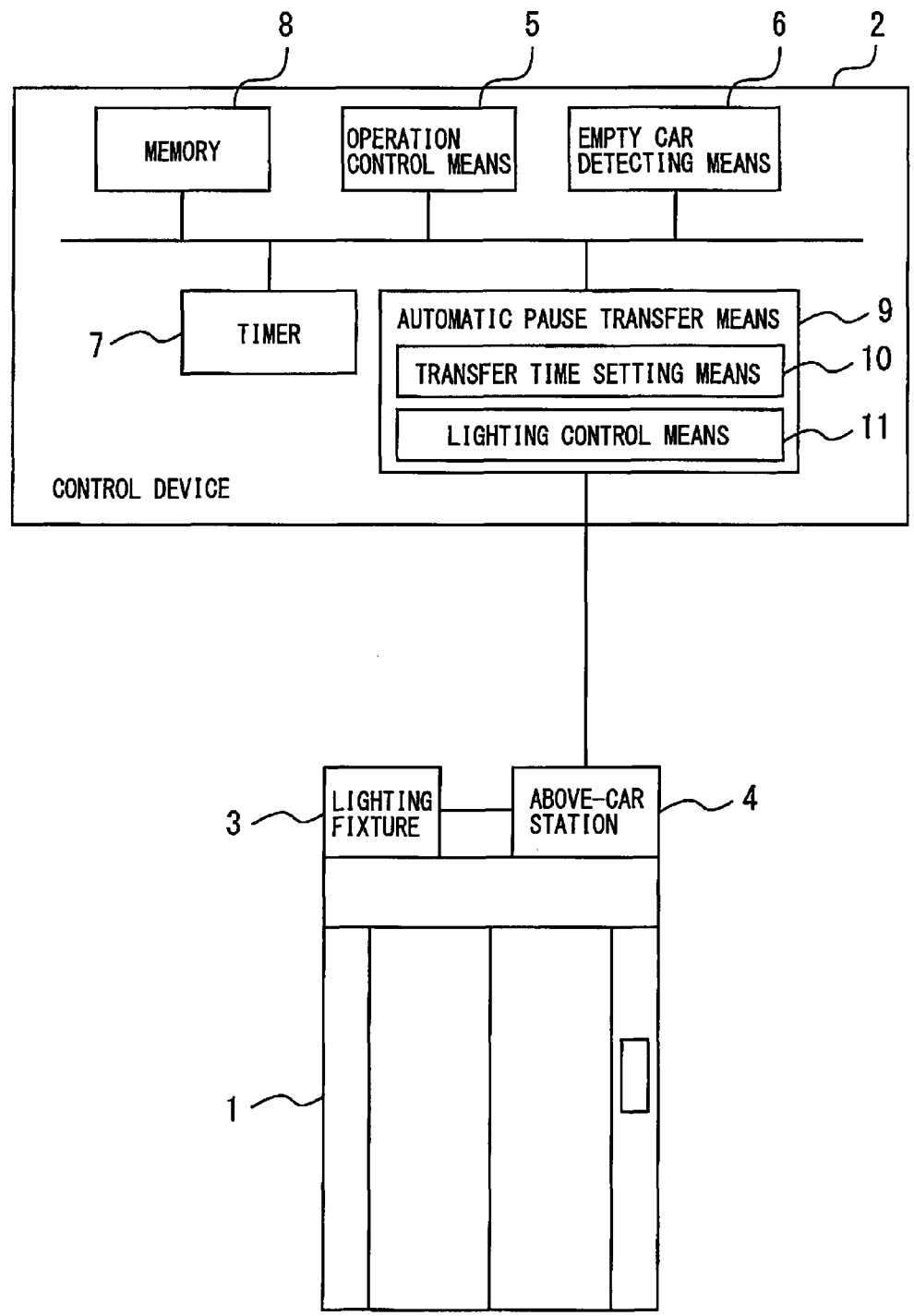
FIG. 1 is a block diagram showing an elevator control device in a first embodiment according to the present invention.

The present invention will be described in more detail with reference to the accompanying drawings. In the drawings, like numerals refer to like or similar parts, and redundant descriptions of these parts are appropriately simplified or omitted.

First Embodiment

FIG. 1 is a block diagram showing an elevator control device in a first embodiment according to the present invention.
In FIG. 1, reference numeral 1 denotes a car moving up and down in an elevator shaft, 2 denotes a control device that carries out the operation control of the whole of the elevator including the control of the car 1.
The car 1 is provided with a lighting fixture 3 and an above-car station 4 in the ceiling portion thereof or above the car.

The lighting fixture 3 is a device for illuminating the interior of the car 1, and the essential portion thereof is composed of a fluorescent lamp or an LED lamp.

The above-car station 4 has a function of carrying out communication with the control device 2 and a function of supplying power to the equipment of the car 1. This above-car station 4 also supplies power to the lighting fixture 3, that is, it supplies or shuts off the power based on the instruction given by the control device 2 to turn on or off the lighting fixture 3.

On the other hand, the essential portion of the control device 2 is composed of an operation control means 5, an empty car detecting means 6, a timer (time measuring means) 7, a memory (storage means) 8, and an automatic pause transfer means 9.

The operation control means 5 has a function of controlling the elevator operation. Specifically, The operation control means 5 carries out control in response to a hall call registered from the elevator hall and a car call registered from the interior of the car 1. Also, when the car 1 finishes responding to all calls, the operation control means 5 keeps the car 1 stopping at a floor at which the response is finished or at a predetermined floor, while the door thereof is closed, until a new call is registered.

The empty car detecting means 6 has a function of detecting that the state is such that the car 1 finishes responding to all calls, and waits the registration of a new call (hereinafter, referred to as a "standby state"). For example, when the car 1 finishes responding to all calls and the car 1 is stopped at a predetermined floor or the like floor, while the door thereof is closed, by the above-described function of the operation control means 5, the empty car detecting means 6 detects the standby state of the car 1.

The timer 7 is a device for measuring the time period for which the standby state of the car 1 continues. That is, when the empty car detecting means 6 detects that the car 1 is in a predetermined standby state, the timer 7 starts the measurement of time. Also, when the empty car detecting means 6 stops detecting that the car 1 is in the standby state after the timer has started the measurement of time, the timer 7 finishes the measurement of time.

The memory 8 is a device for storing the type of the lighting fixture 3 provided in the car 1. This memory 8 stores a predetermined parameter for distinguishing the type of the lighting fixture 3 (for example, the lighting fixture 3 is configured by a fluorescent lamp or an LED lamp). At the time of the shipment of elevator, in the memory 8, a proper parameter in accordance with the type of the lighting fixture 3 provided in the car 1 has been stored in advance. Also, since the type of the lighting fixture 3 may be changed after shipment, the configuration is made such that the parameter stored in the memory 8 can be changed by an expert engineer or the like even after the elevator has been operated.

The automatic pause transfer means 9 has a function of automatically pausing the car 1 that is in the standby state. That is, when a predetermined condition is met after the car 1 has transferred to the standby state, the automatic pause transfer means 9 turns the lighting fixture 3 off and pauses the car 1. The automatic pause is made by the automatic pause transfer means 9 based on the condition considering the type (property) of the lighting fixture 3. To realize such a function, the automatic pause transfer means 9 includes a transfer time setting means 10 and a lighting control means 11.

The transfer time setting means 10 has a function of setting a proper transfer time in accordance with the type of the lighting fixture 3 based on the type of the lighting fixture 3 stored in the memory 8.

Specifically, the transfer time setting means 10 determines the type of the lighting fixture 3 (for example, whether the lighting fixture 3 is configured by a fluorescent lamp or an LED lamp) based on the parameter stored in the memory 8. Then, after determining the type of the lighting fixture 3 provided in the car 1 from the storage content of the memory 8, the transfer time setting means 10 sets the transfer time for automatically pausing the car 1 based on the determined content.

The lighting control means 11 has a function of carrying out control to turn the lighting fixture 3 on and off.

Specifically, during the time when the car 1 responds to a call, the lighting control means 11 outputs a turning-on instruction to the above-car station 4 to turn the lighting fixture 3 on. Also, when the standby state of the car 1 continues for the above-described transfer time, the lighting control means 11 turns off the lighting in the car 1 and automatically pauses the car 1 to cut wasteful power consumption. That is, when the empty car detecting means 6 detects the standby state of the car 1, and the standby state continues for the transfer time set by the transfer time setting means 10, the lighting control means 11 outputs a turning-off instruction for turning off the lighting in the car 1 to the above-car station 4.

Figure 2:
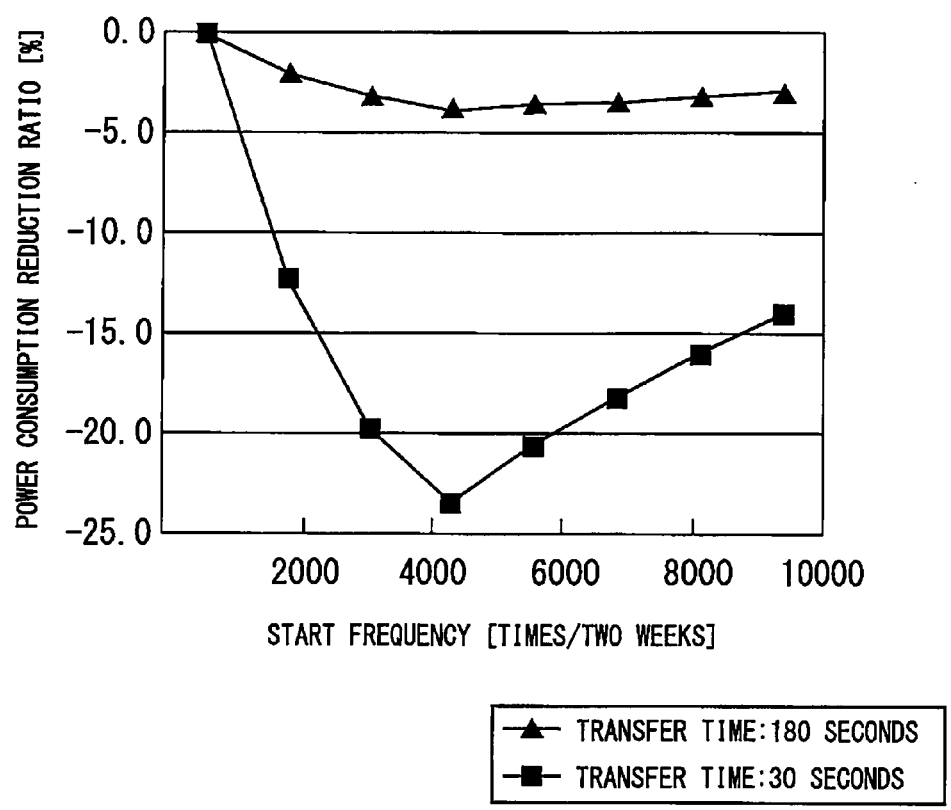
FIG. 2 is a graph showing a relationship between a transfer time and power consumption reducing effect.

Hereunder, the relationship between the transfer time and the power consumption reducing effect is explained with reference to FIG. 2. FIG. 2 is a graph showing the relationship between the transfer time and the power consumption reducing effect.

In FIG. 2, the ordinates represent the power consumption reduction ratio in the case where the lighting fixture 3 is configured by an LED lamp, and the abscissas represent the elevator start frequency per two weeks. The power consumption reduction ratio represented on the ordinate indicates how much the power consumption is reduced in the case where the lighting fixture 3 is configured by the LED lamp as compared with the case where the lighting fixture 3 is configured by the fluorescent lamp, that is, the ratio of reduction in power consumption of the case where the lighting fixture 3 is configured by the LED lamp to the case where the lighting fixture 3 is configured by the fluorescent lamp. Also, the triangular mark in FIG. 2 indicates the case where the transfer time is set at 180 seconds as in the conventional example, and the square mark indicates the case where the transfer time is set at 30 seconds.

For the elevator installed in the general apartment house, the start frequency per two weeks is about 2800 times. In such a case, even if the lighting fixture 3 is configured by an LED lamp, if the transfer time is set at 180 seconds, the power consumption reducing effect is only about 3 percent. On the other hand, if the lighting fixture 3 is configured by the LED lamp, and further the transfer time is set at 30 seconds, a power consumption reducing effect of about 20 percent can be anticipated.

As described above, the LED lamp is scarcely deteriorated by the repetition of turning-on and turning-off, and there is no fear that the service life is shortened by the above-described repetition. Therefore, for example, in the case where the memory 8 stores the fact that the lighting fixture 3 is configured by an LED lamp, the transfer time is set at 30 seconds, which is shorter than the transfer time in the conventional example, anticipating the cumulative effect of shortened lighting time of lighting.

On the other hand, for the fluorescent lamp, as described above, if the turning-on and turning-off are repeated frequently, the deterioration of fluorescent lamp proceeds, and the service life thereof shortens. Therefore, for example, in the case where the memory 8 stores the fact that the lighting fixture 3 is configured by an fluorescent lamp, the transfer time is set at 180 seconds, which is longer than the transfer time of the LED lamp by giving a higher priority to the service life of the lighting fixture 3 over the power consumption reducing effect.

Figure 3:
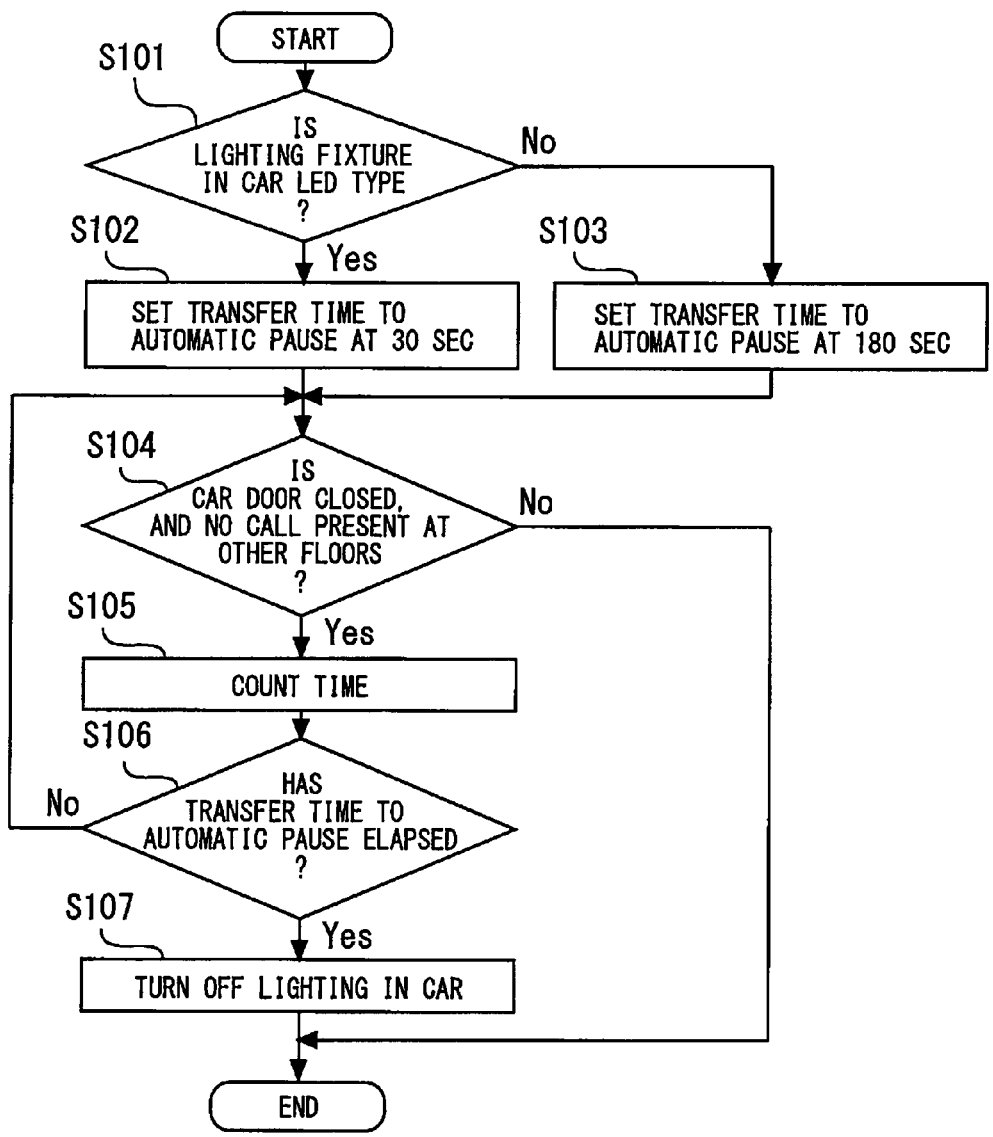
FIG. 3 is a flowchart showing the operation of an elevator control device in the first embodiment according to the present invention.

Next, the operation of the control device 2 having the above-described specific configuration is explained with reference to FIG. 3. FIG. 3 is a flowchart showing the operation of an elevator control device in the first embodiment according to the present invention.

In the control device 2, firstly, the type of the lighting fixture 3 mounted in the car 1 is determined by using the automatic pause transfer means 9. Specifically, the automatic pause transfer means 9 reads the value of parameter stored in the memory 8, and also determines whether or not the lighting fixture 3 is configured by an LED lamp by using the transfer time setting means 10 (S101). If it is determined in S101 that the lighting fixture 3 is configured by an LED lamp, the transfer time setting means 10 sets the transfer time at the time when the car 1 is automatically paused at 30 seconds (S 102). Also, if it is determined in S101 that the lighting fixture 3 is not an LED lamp, the transfer time setting means 10 determines that the lighting fixture 3 is configured by a fluorescent lamp, and sets the transfer time at 180 seconds (S103).

After the setting of transfer time in accordance with the type of the lighting fixture 3 has been finished, next, the automatic pause transfer means 9 determines whether or not the condition for the car 1 to be automatically paused has been met. In the control device 2, when the door of the car 1 is closed, and no call is present at other floors (Yes in S104), the empty car detecting means 6 detects the standby state of the car 1, and the count of time is started by using the timer 7 (S105). Then, when the count of time is started by using the timer 7, the transfer time setting means 10 compares the counted time with the transfer time set in S102 or S103, and determines whether or not the standby state of the car 1 has continued for the transfer time (S106). If a hall call or the like is registered before the time counted by the timer 7 exceeds the transfer time, and the standby state of the car 1 comes to be not detected by the empty car detecting means 6 (No in S104), the timer 7 is reset, and the operation is finished.

On the other hand, if the time counted by the timer 7 exceeds the transfer time (Yes in S106), the automatic pause transfer means 9 pauses the car 1 automatically to prevent wasteful consumption of power. That is, the lighting control means 11 outputs a turning-off instruction to the above-car station 4 to turn off the lighting in the car 1 (S107).

In S107, in addition to the turning-off of the lighting in the car 1, the power source for a ventilator, air purifier, in-car indicator, in-car security camera, and the like may be shut off as appropriate.

According to the first embodiment of the present invention, proper turning-off control considering the energy saving and the service life of lamp can be carried out for various types of the lighting fixtures 3 provided in the elevator car 1. Also, even in the case where the lighting fixture 3 is changed to a lighting fixture having a higher energy saving effect after the elevator has been operated, proper transfer time can be set according to the type of the changed lighting fixture 3. Therefore, for example, in the case where the lamp of the lighting fixture 3 is changed from a fluorescent lamp to an LED lamp, in addition to the reduction in power consumption caused by the change of type of the lighting fixture 3, a reduction in power consumption caused by the shortening of lighting time can be realized.

In this embodiment, the case where the lighting fixture 3 is configured by a fluorescent lamp and an LED lamp has been explained specifically. However, the types of the lighting fixtures 3 are not limited to these types. For example, an organic EL lamp and the like may be adopted as the lighting fixture 3 to save energy.

Also, the number of types of the lighting fixtures 3 capable of being stored in the memory 8 may be three or more. In such a case, for example, the transfer time setting means 10 sets transfer time having a different length for each of the types of the lighting fixtures 3 capable of being stored in the memory 8 to realize the optimum turning-off control.

INDUSTRIAL APPLICABILITY

The elevator control device according to the present invention can be applied to all elevators in which the lighting fixture provided in the car is controlled regardless of the elevator type and the like.

REFERENCE SIGNS LIST 1 car
2 control device
3 lighting fixture
4 above-car station
5 operation control means
6 empty car detecting means
7 timer
8 memory
9 automatic pause transfer means
10 transfer time setting means
11 lighting control means

The invention claimed is:

1. An elevator control device which controls a lighting fixture provided in an elevator car, comprising:
    a storage device which stores the type of the lighting fixture;
    a setting device which sets a transfer time for automatically pausing the car based on the type of the lighting fixture stored in the storage device;
    a detecting device which detects that the car is in a predetermined standby state; and
    a lighting control device which turns off the lighting in the car when the standby state of the car continues for the transfer time set by the setting device.

2. The elevator control device according to claim 1, wherein
    the storage device can store a fluorescent lamp and an LED lamp as the types of the lighting fixtures; and
    the setting device sets a predetermined first time as the transfer time when the storage device stores the fact that the lighting fixture is configured by a fluorescent lamp, and sets a predetermined second time shorter than the first time as the transfer time when the storage device stores the fact that the lighting fixture is configured by an LED lamp.

3. The elevator control device according to claim 1, wherein
    the storage device can store a plurality of types as the types of the lighting fixtures; and
    the setting device sets a transfer time having a different length for each of the types of the lighting fixtures capable of being stored in the storage device.

* * * * *